(12) United States Patent
Yamamichi

(10) Patent No.: US 11,392,549 B2
(45) Date of Patent: Jul. 19, 2022

(54) INFORMATION PROCESSING APPARATUS, CONTROL METHOD THEREFOR, STORAGE MEDIUM, AND INFORMATION PROCESSING SYSTEM

(71) Applicant: CANON KABUSHIKI KAISHA, Tokyo (JP)

(72) Inventor: Masaki Yamamichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 16/521,443

(22) Filed: Jul. 24, 2019

(65) Prior Publication Data

US 2020/0042499 A1  Feb. 6, 2020

(30) Foreign Application Priority Data

Jul. 31, 2018  (JP) .............................. JP2018-143942

(51) Int. Cl.
  *G06F 12/00*  (2006.01)
  *G06F 16/17*  (2019.01)
  *G06F 16/16*  (2019.01)
  *G06F 11/34*  (2006.01)

(52) U.S. Cl.
  CPC ...... *G06F 16/1734* (2019.01); *G06F 11/3438* (2013.01); *G06F 11/3476* (2013.01); *G06F 16/168* (2019.01)

(58) Field of Classification Search
  CPC .................................................. G06F 16/1734
  USPC ........................................................ 707/822
  See application file for complete search history.

(56) References Cited

U.S. PATENT DOCUMENTS

| 8,271,778 | B1 * | 9/2012 | Zhou ...................... H04L 43/04 |
| | | | 713/154 |
| 2011/0264663 | A1 * | 10/2011 | Verkasalo .......... G06Q 10/0637 |
| | | | 707/740 |
| 2014/0280896 | A1 * | 9/2014 | Papakostas ............. H04W 4/50 |
| | | | 709/224 |

FOREIGN PATENT DOCUMENTS

JP  2006-236231 A  9/2006

* cited by examiner

*Primary Examiner* — Timothy A Mudrick
(74) *Attorney, Agent, or Firm* — Canon U.S.A., Inc. IP Division

(57) ABSTRACT

An information processing apparatus includes an automatic operation application as an application for automatically executing an operation corresponding to a user operation on one or more graphical user interface (GUI) applications, and a determination unit configured to determine whether the one or more GUI applications are started by the automatic operation application. In a case where it is determined that the one or more GUI applications are started by the automatic operation application, an operation log obtained when the one or more GUI applications are executed is not transmitted.

13 Claims, 17 Drawing Sheets

FIG.4A
EXAMPLE OF SIMPLE
OPERATION LOG

```
AddAnnotation
MoveAnnotation
SaveFile
Window Close
       .
       .
       .
```
~401

FIG.4B
EXAMPLE OF DETAILED
OPERATION LOG

```
PrepareAddAnnotation
Parameter[text,Meiryo,12pt,Red]
MouseLeftButtonDown
Point (100,100)
MouseMove
(100,100)-(200,200)
MouseLeftButtonUp
Point (200,200)
UpdateImage
MoveAnnotation
MouseLeftButtonDown
Point (200,200)
MouseMove
(200,200)-(300,300)
MouseLeftButtonUp
Point (300,300)
SaveFile user.pdf
Window Close
       .
       .
       .
```
~402

EXCLUDED PROCESS LIST

CANDIDATE PROCESS LIST

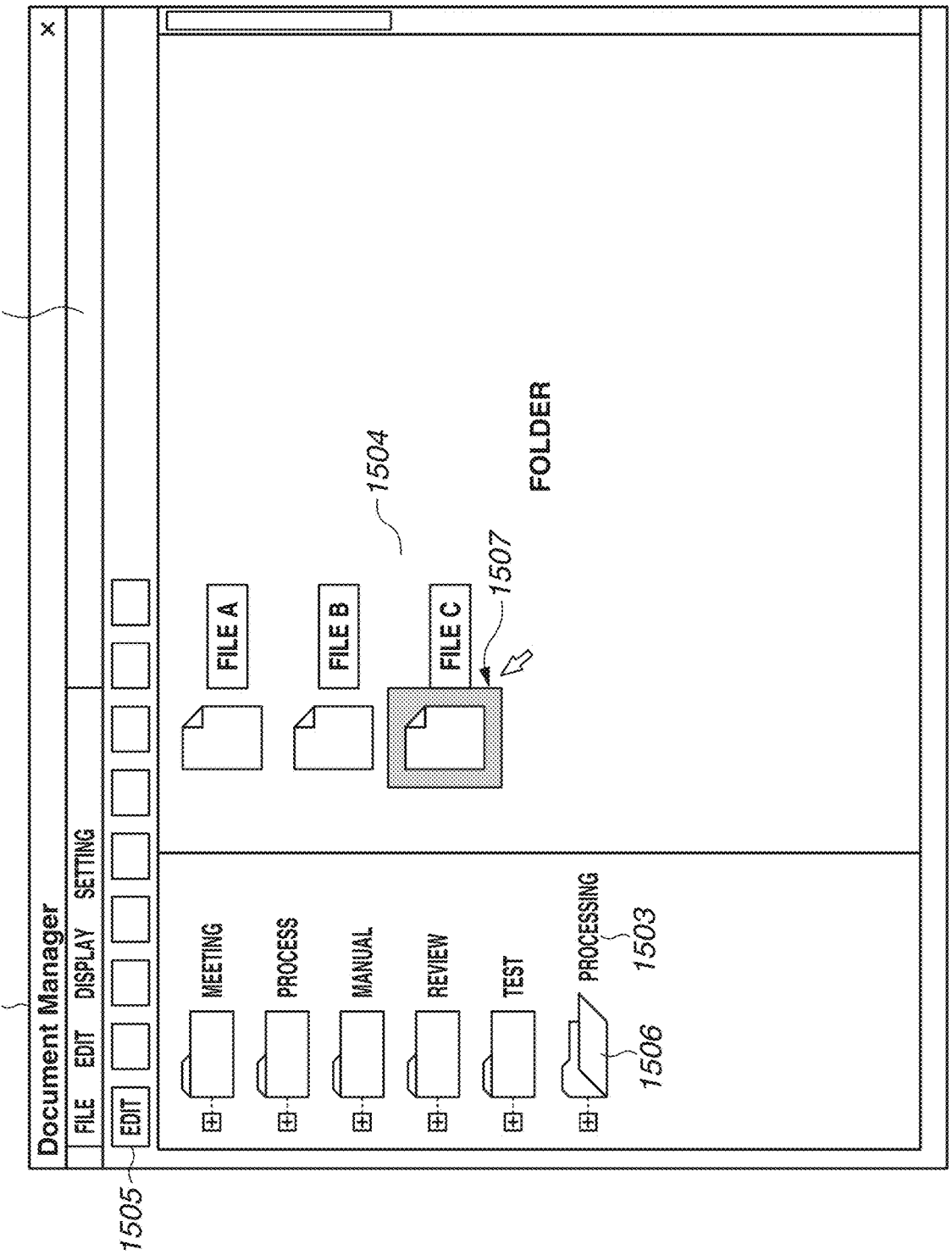

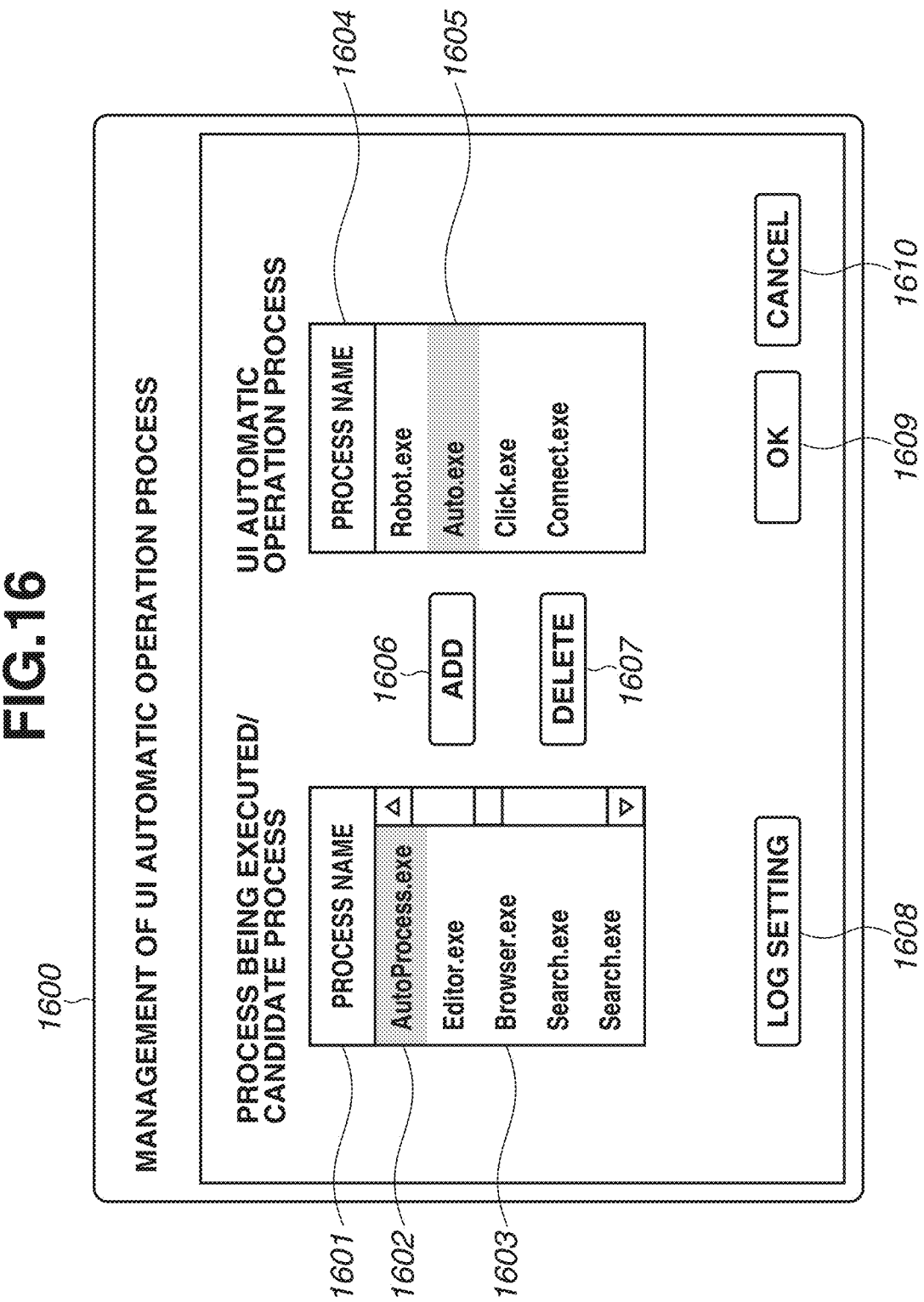

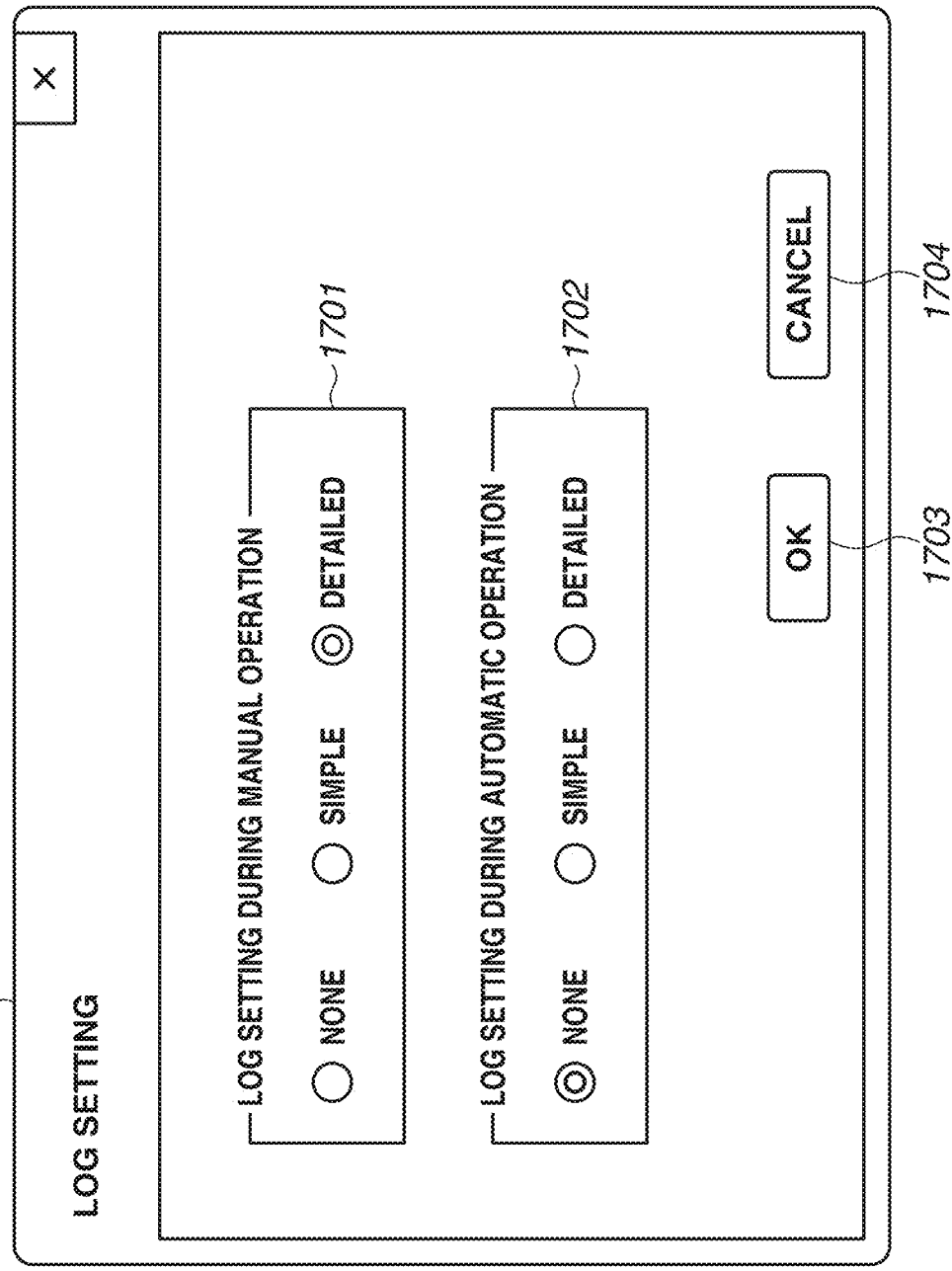

INFORMATION PROCESSING APPARATUS, CONTROL METHOD THEREFOR, STORAGE MEDIUM, AND INFORMATION PROCESSING SYSTEM

BACKGROUND

Field of the Disclosure

The present disclosure relates to an information processing apparatus that outputs an operation log, a control method for the information processing apparatus, a storage medium, and an information processing system.

Description of the Related Art

In current practice, by combining activities for executing processing corresponding to contents of work, operations are automated. For example, scan data is analyzed and classified, and necessary information is extracted from the scan data based on the classification.

Meanwhile, there is a technique for automatically executing such an operation that is performed on a user interface (UI) by a user, using an application (hereinafter referred to as a UI automatic operation application) for automatically operating a UI for a graphical user interface (GUI) application. This technique is generally referred to as robotic process automation (RPA). In addition, a configuration in which artificial intelligence (AI), machine learning, or the like is used in combination with RPA to improve a recognition accuracy, thereby increasing the application range of the UI automatic operation application is known.

In the case of automating a user operation on a UI by RPA, it is necessary to recognize the operation to be automated. As a method for recognizing the operation, not only a method of recognizing the operation by interviewing an operator directly, but also a method of recognizing the operation by collecting operation logs obtained when a GUI application is operated by a user and analyzing the operation logs is known. In recent years, a technique in which an operation log output by a GUI application operated on each client terminal is transmitted to a server on a cloud system via the Internet and the operation log is analyzed by the cloud system has been performed.

As a method for outputting such an operation log, Japanese Patent Application Laid-Open No. 2006-236231 discusses a server apparatus that sets a detail level of an operation log to "coarse" in a normal operating state in which a monitoring apparatus operates stably, and sets the detail level of the operation log to "fine" in states other than the normal operating state.

SUMMARY

According to embodiments of the present disclosure, an information processing apparatus includes one or more graphical user interface (GUI) applications for providing a specific function through a screen of the information processing apparatus and transmits, to a server, an operation log as an operation record obtained when the one or more GUI applications are executed. The information processing apparatus includes an automatic operation application as an application for automatically executing an operation corresponding to a user operation on the one or more GUI applications, and a determination unit configured to determine whether the one or more GUI applications are started by the automatic operation application. In a case where the determination unit determines that the one or more GUI applications are started by the automatic operation application, the operation log obtained when the one or more GUI applications are executed is not transmitted.

Further features of the present disclosure will become apparent from the following description of exemplary embodiments with reference to the attached drawings.

BRIEF DESCRIPTION OF THE DRAWINGS

FIGS. 4A and 4B are diagrams each illustrating an output example of an operation log according to the first exemplary embodiment of the present disclosure.

FIG. 15 is a diagram illustrating an example of a main window in the GUI application according to the second exemplary embodiment of the present disclosure.

FIG. 16 illustrates an example of a management dialogue for a UI automatic operation process in the GUI application according to the second exemplary embodiment of the present disclosure.

FIG. 17 illustrates an example of a log setting dialogue in the GUI application according to the second exemplary embodiment of the present disclosure.

DESCRIPTION OF THE EMBODIMENTS

As an operation log to be output from a client terminal becomes more detailed, an analysis accuracy of a cloud system increases. However, there is no need for the cloud system to analyze an operation log of an operation that has already been automated by a user interface (UI) automatic operation application. If a detailed operation log of an automated operation is output, a huge number of operation logs are output, which exerts a load on a network during transmission of the operation logs.

In view of the above-described issue, the present disclosure is directed to reducing a load on a network during transmission of an operation log by preventing transmission of an operation log of an already automated operation to a cloud system.

Embodiments of the present invention will be described below with reference to the accompanying drawings.

[System Configuration]

Figure 1:
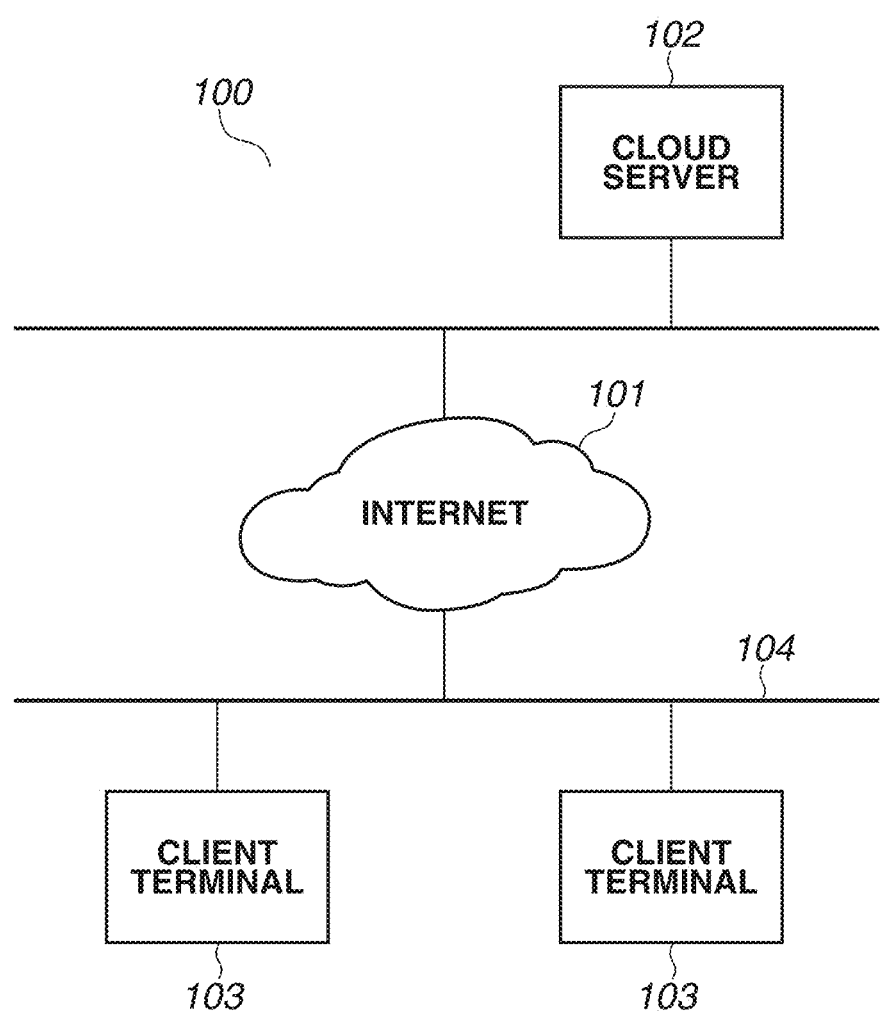
FIG. 1 is a diagram illustrating a configuration example of an information processing cloud system according to a first exemplary embodiment of the present disclosure.

A first exemplary embodiment is described based on the premise that a graphical user interface (GUI) application provided on each client terminal outputs an operation log and the output operation log is transmitted to a cloud server. The term "operation log" used herein refers to an operation record obtained when a GUI application is executed. FIG. 1 illustrates a configuration of an information processing system 100 in which operation logs of client terminals 103 are stored in a cloud server 102. The information processing system 100 includes the cloud server 102 that stores and analyzes operation logs, and a plurality of client terminals 103. The cloud server 102 and the client terminals 103 are connected to each other via a local area network (LAN) 104 and the Internet 101.

The Internet 101 is a communication line used to exchange operation logs and user instructions between the cloud server 102 and each client terminal 103 across a firewall. Each client terminal 103 indicates a terminal, such as a personal computer (PC), a tablet, or a smartphone, which is allocated to each user. The LAN 104 and the Internet 101 are communication networks that support, for example, protocols such as Transmission Control Protocol (TCP)/Internet Protocol (IP), and the communication networks are wired or wireless communication networks.

The cloud server 102 includes a function for analyzing an operation log acquired from each client terminal 103 when a user operation on the GUI application on the client terminal 103 is to be automated in the future. To analyze an operation log, for example, the cloud server 102, or a learning apparatus including a system similar to that of the cloud server 102 is caused to learn a large number of operation logs and to statistically analyze the tendency of user operations. The GUI application is automated based on the analysis result. Accordingly, according to the present exemplary embodiment, only operation logs on user operations are transmitted to the cloud server 102 to cause the cloud server 102 to analyze the tendency of user operations.

The cloud server 102 may be configured using one computer, or may be configured using a plurality computers depending on the function or role of the cloud server 102. If the cloud server 102 is implemented by a plurality of computers, some of the computers may be configured as a virtual PC.

FIG. 1 illustrates a configuration in which the plurality of client terminals 103 is present. However, the number of the client terminals 103 is not particularly limited. In the following exemplary embodiments, the client terminals 103 are collectively referred to as the "client terminal 103", regardless of the number of the client terminals 103.

[Hardware Configuration]

Figure 2:
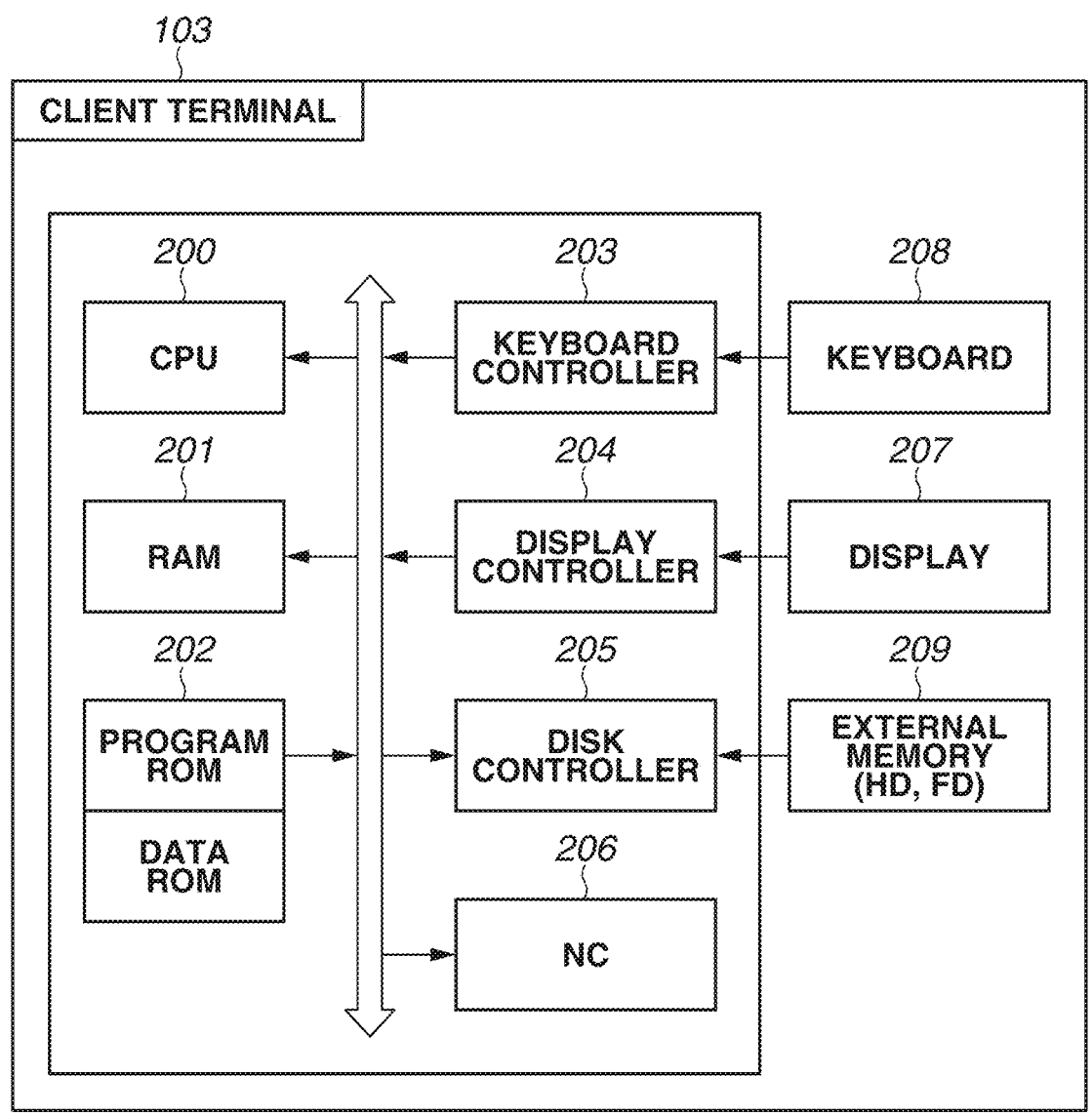
FIG. 2 is a block diagram illustrating a hardware configuration example of each of a client terminal and a cloud server according to the first exemplary embodiment of the present disclosure.

FIG. 2 is a block diagram illustrating a hardware configuration of various apparatuses according to the present exemplary embodiment. In the present exemplary embodiment, the client terminal 103 is described by way of example and the cloud server 102 has a hardware configuration similar to that of the client terminal 103. The hardware configuration illustrated in FIG. 1 corresponds to the hardware configuration of a general information processing apparatus. The hardware configuration of the general information processing apparatus can be applied to the client terminal 103 according to the present exemplary embodiment.

In FIG. 2, a central processing unit (CPU) 200 executes programs, such as an operating system (OS) and an application, which are stored in a read-only memory (ROM) for programs in a ROM 202, or are loaded from a hard disk 209 into a random access memory (RAM) 201. Processing in each flowchart to be described below is implemented in such a manner that the CPU 200 executes a program. The RAM 201 functions as a main memory, a work area, or the like for the CPU 200. A keyboard controller 203 controls an input from a pointing device (not illustrated), such as a keyboard 208 or a mouse. A display controller 204 controls display on various types of display 207. A disk controller 205 controls data access in the hard disk (HD) 209, a Floppy® disk (FD), or the like, which stores various data. A network controller (NC) 206 is connected to a network and executes communication control processing for communicating with other devices connected to the network.

[Software Configuration]

Figure 3:
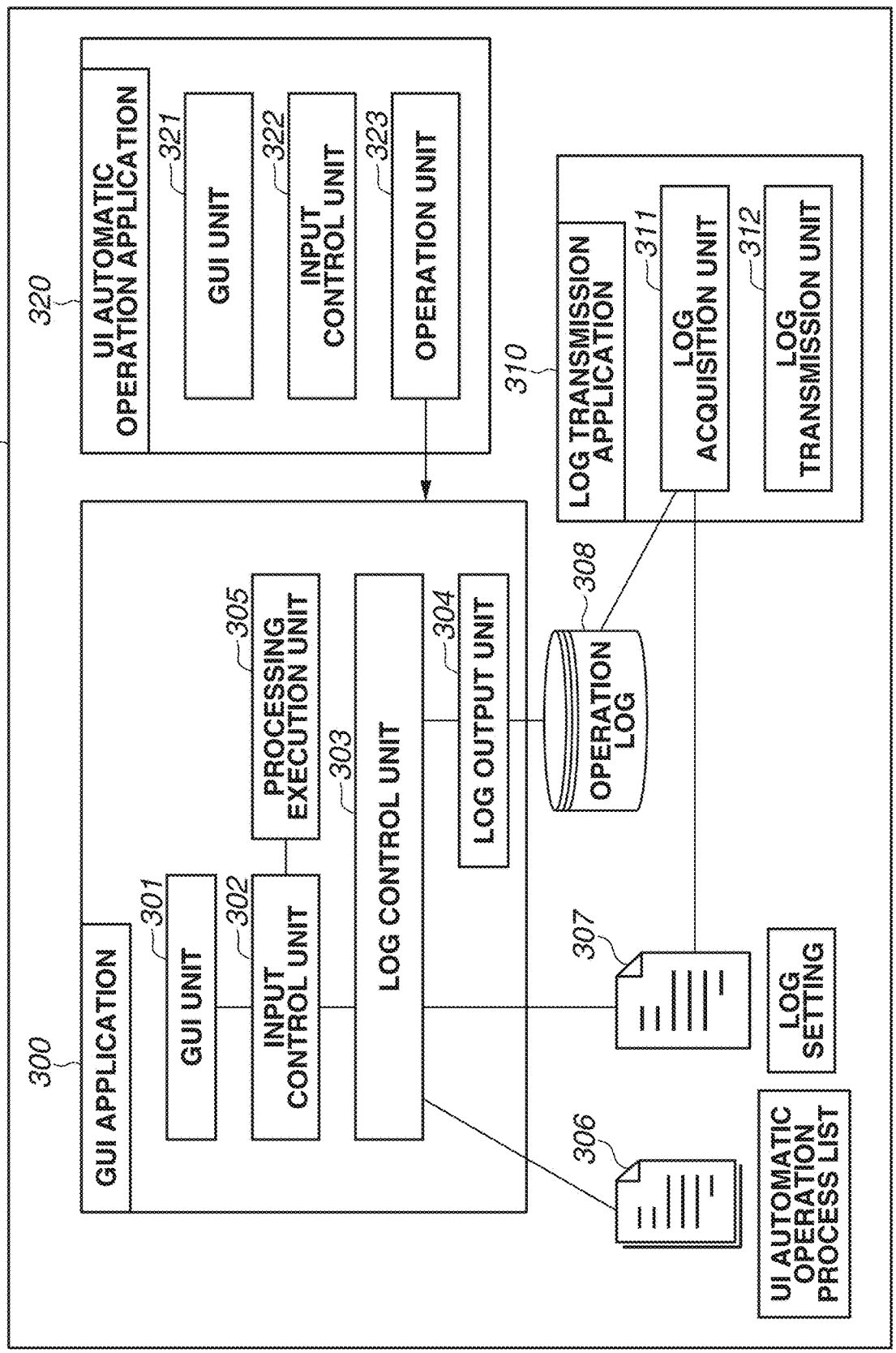
FIG. 3 is a block diagram illustrating a software configuration example of the client terminal according to the first exemplary embodiment of the present disclosure.

FIG. 3 is a block diagram illustrating a software configuration example of the client terminal 103 according to the present exemplary embodiment. A function of a GUI application 300 is implemented by a program to be executed on the client terminal 103. Components that are described above with regard to the hardware configuration illustrated in FIG. 2 are denoted by the same reference numerals, and the descriptions thereof are omitted.

The GUI application 300 is displayed on the display 207 of the client terminal 103, and includes a GUI unit 301, an input control unit 302, a log control unit 303, a log output unit 304, and a processing execution unit 305. The GUI unit 301 receives an input from an input device such as a keyboard or a mouse. The input control unit 302 detects a user operation on the keyboard 208 through the GUI unit 301 and issues an instruction to execute processing in response to the operation. The log control unit 303 controls the presence or absence of an output of an operation log and the content of the operation log according to the instruction from the input control unit 302. The log output unit 304 outputs an operation log according to an output instruction from the log control unit 303. The processing execution unit 305 executes a function to be provided to a user according to the instruction from the input control unit 302.

Further, the hard disk 209 of the client terminal 103 includes a UI automatic operation process list 306 and a log setting 307. The UI automatic operation process list 306 is a list of process names in an application for automatically operating a UI. The log setting 307 is a setting about an output of an operation log. The client terminal 103 loads these pieces of data and performs processing on the output of the operation log.

The hard disk 209 further includes an operation log 308 that is output based on the content of the operation performed on the GUI application 300.

The client terminal 103 includes a log transmission application 310. The log transmission application 310 includes a log acquisition unit 311 that acquires the operation log 308 output by the GUI application 300, and a log transmission unit 312 which is a function for transmitting the operation log 308 to the cloud server 102.

The client terminal 103 includes a UI automatic operation application 320. The UI automatic operation application 320 is displayed on the display 207 of the client terminal 103, and includes a GUI unit 321, an input control unit 322, and an operation unit 323. The GUI unit 321 receives an input from an input device such as a keyboard or a mouse. The input control unit 322 detects a user operation on the keyboard 208 through the GUI unit 321 and issues an instruction to execute processing according to the operation. The operation unit 323 operates a UI application.

<Display Screen of GUI Application 300>

Figure 10:
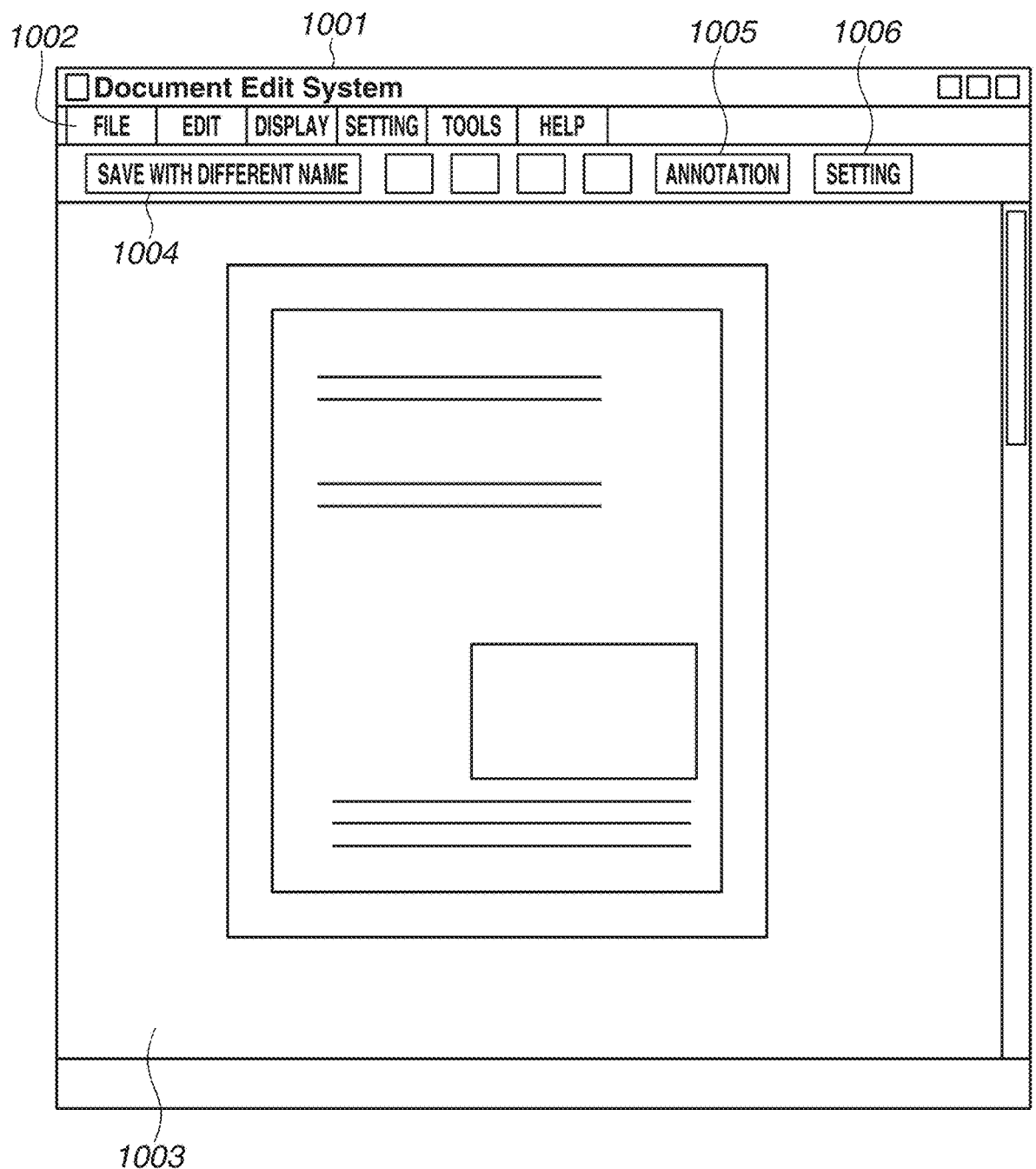
FIG. 10 is a diagram illustrating an example of a main window in the GUI application.

FIG. 10 is a diagram illustrating an example of a main window 1001 to be displayed by the GUI unit 301 of the GUI application 300. The GUI application 300 includes a function for displaying and editing document data. The main window 1001 includes a menu/toolbar 1002 and a page preview 1003.

The menu/toolbar 1002 is a display area in which various functions included in the GUI application 300 are arranged. Examples of the functions include a control 1004 for saving edited document data, a control 1005 for adding an annotation to document data, and a control 1006 for performing various settings for the GUI application 300. On the page preview 1003, drawing contents on each page of document data are displayed. Display contents on the main window 1001 is changed based on the function held by the GUI application 300, and the function to be applied to the present exemplary embodiment is not limited to the function of editing document data.

An example of the main window 1001 to be displayed by the GUI application 300 has been described above.

<Display Screen of UI Automatic Operation Application 320>

Figure 11:
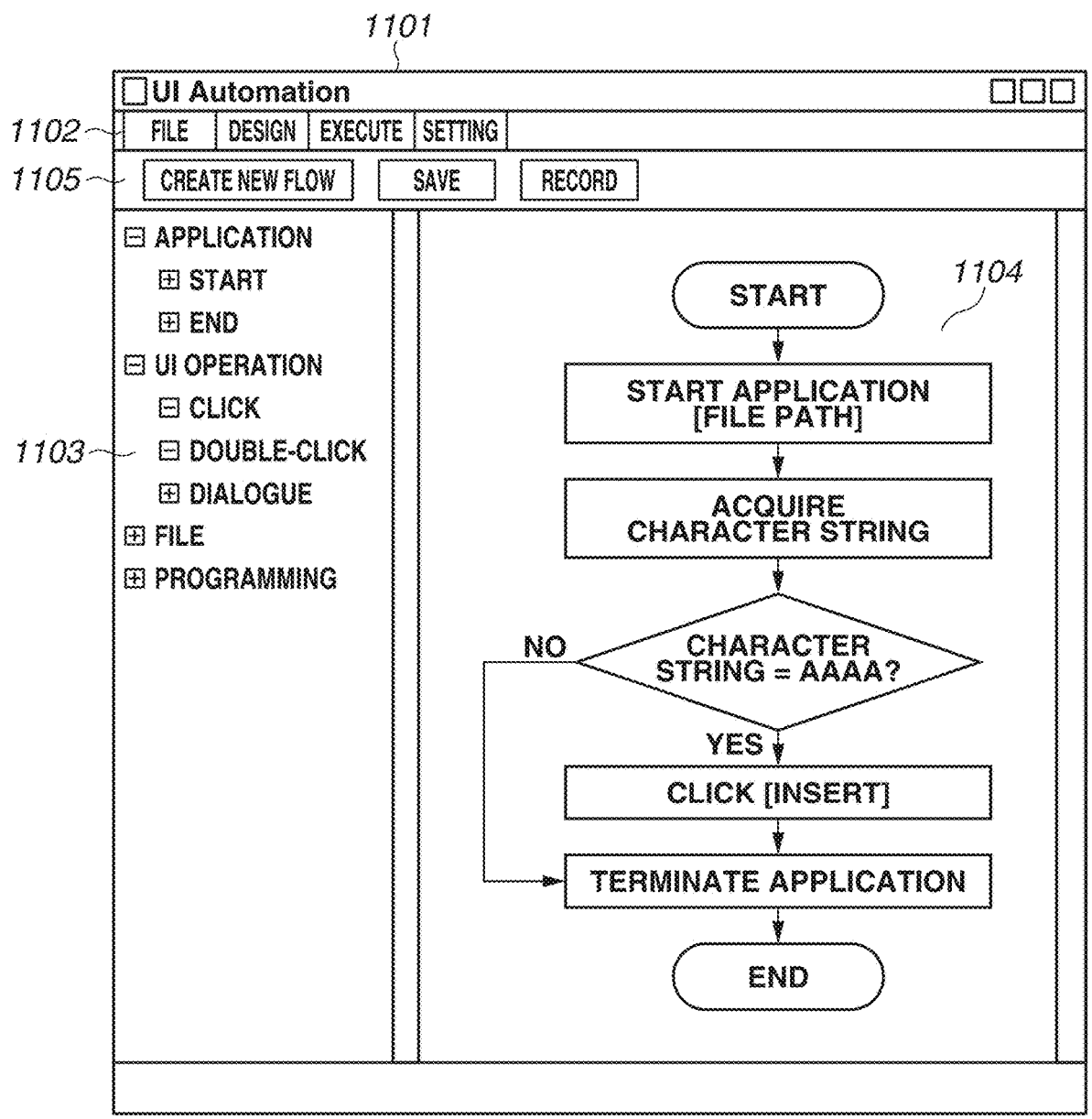
FIG. 11 is a diagram illustrating an example of a main window in a UI automatic operation application.

FIG. 11 illustrates an example of a main window 1101 to be displayed by the GUI unit 321 of the UI automatic operation application 320. As illustrated in FIG. 3, the GUI unit 301 that displays the main window 1001 and the GUI unit 321 that displays the main window 1101 are independent from each other. The main window 1101 includes a menu/toolbar 1102, an activity list 1103, and a UI operation flow 1104. In the menu/toolbar 1102, various functions included in the UI automatic operation application 320 are arranged. Examples of the functions include a control "create new flow" for creating a new UI operation flow to operate the GUI application 300, and a control "save" for saving data.

In the activity list 1103, various activities for operating the GUI application 300 are displayed. The term "activity" used herein refers to a user operation or a content to be recognized by a user that is clipped and converted into a unit that can be executed by the UI automatic operation application 320. Examples of the activity include an activity for starting the GUI application 300, an activity for clicking a mouse, and an activity for recognizing a display content. The UI operation flow 1104 is an operation flow obtained by connecting various activities included in the activity list 1103. It is possible not only to connect activities to each other, but also to divide activities to be executed depending on specific conditions.

While the present exemplary embodiment illustrates a configuration for causing the user to create an operation flow, such as the UI operation flow 104, as a method for designating an operation to be automated, the present disclosure is not limited to this configuration. A configuration in which the user causes an operation to be actually executed on the main window, to store a series of operations carried out by the user and use the operations as operations to be automated may also be employed.

An example of the main window 1101 to be displayed by the UI automatic operation application 320 has been described above.

[Data Structure]

FIGS. 4A and 4B are diagrams each illustrating an example of an operation log output by the GUI application 300.

An operation log 401 illustrated in FIG. 4A is a simple operation log which indicates a state in which the content of the executed operation is output in a simple manner. In this case, operation contents such as "AddAnnotation (add annotation)", "MoveAnnotation (move annotation)", "SaveFile (save file)", and "WondowClose (close window)" are described.

An operation log 402 illustrated in FIG. 4B is a detailed operation log which indicates a state in which the content of the executed operation is output in a detailed manner together with settings made during the operation and the executed operation. For example, in addition to the content of the operation described in the operation log 401, the operation, such as "MouseMove" (move mouse), which has been performed during each execution processing, is described, and each execution processing is also described in more detail. The content to be output depending on a detail level of an operation log may be changed based on the function held by the GUI application 300.

The operation logs 401 and 402 descried herein are merely examples. Each of the operation logs 401 and 402 may have a more detailed or simpler configuration.

<UI Automatic Operation Process List>

Figure 5:
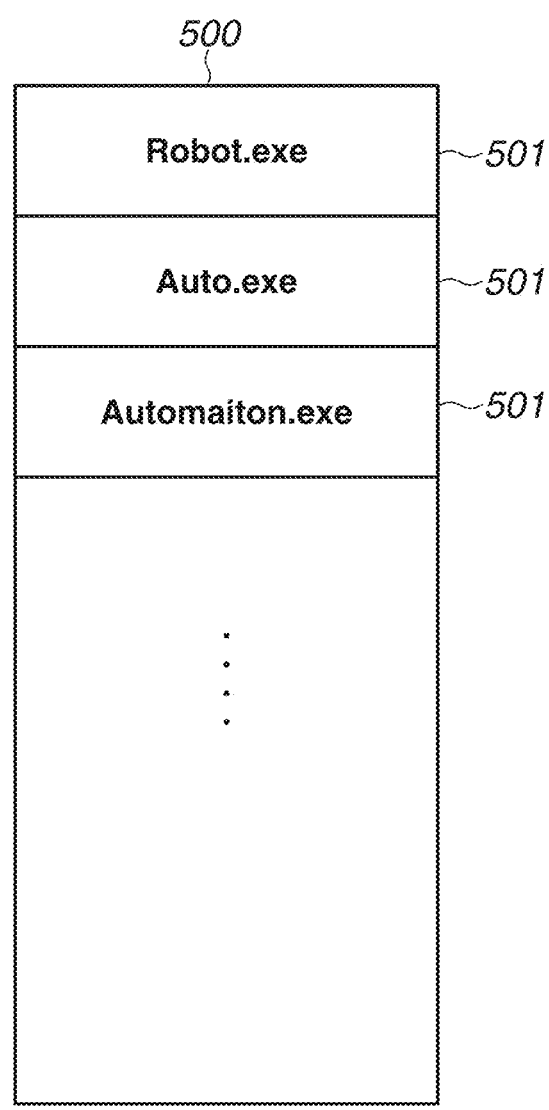
FIG. 5 is a diagram illustrating a data structure of a user interface (UI) automatic operation process list according to the first exemplary embodiment of the present disclosure.

FIG. 5 illustrates an example of the UI automatic operation process list that manages process names recognized by the GUI application 300 as the UT automatic operation application 320. The term "process" used herein refers to an execution unit for a program to be executed when various applications are started. Specifically, when a single application is started, one or more processes are started.

The GUI application 300 determines whether the process is executed by the UI automatic operation application 320 by referring to a UI automatic operation process list 500. The UI automatic operation process list 500 includes one or more UI automatic operation processes 501. In this case, each UI automatic operation process 501 is managed in a file format ".exe" of a program file. However, the file format and the like are not particularly limited.

Each UI automatic operation process included in the UI automatic operation process list 500 may be any process selected through a selection operation by the user as described below, or may be a process created by analyzing the operation log of a user operation by the cloud server 102. According to the present exemplary embodiment, the description of a specific method in which the cloud server 102 creates a UI automatic operation process using an operation log is omitted.

<Log Setting>

Figure 6:
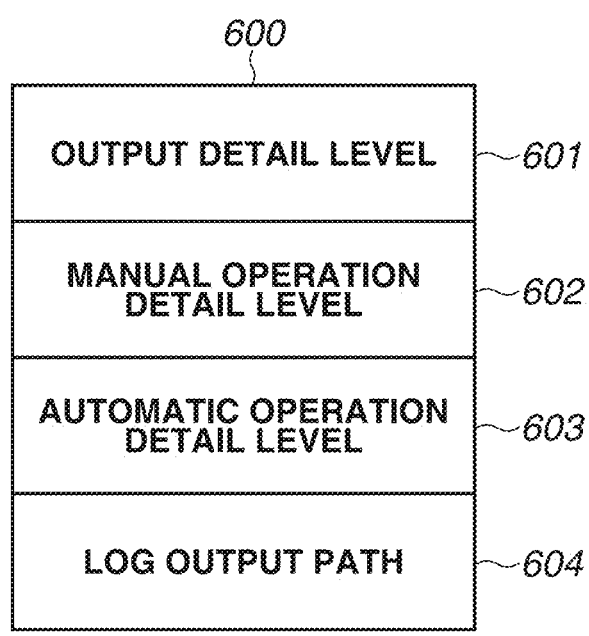
FIG. 6 is a diagram illustrating a data structure of a log setting according to the first exemplary embodiment of the present disclosure.

FIG. 6 is a conceptual diagram illustrating a data structure of a log setting 600 held by the GUI application 300. The log setting 600 includes an output detail level 601, a manual operation detail level 602, an automatic operation detail level 603, and a log output path 604. These parameters are set in advance to thereby determine the detail level of the content described in the operation log to be output by the GUI application 300. The detail level of the content described in the operation log has been described above with reference to FIGS. 4A and 4B. The operation logs 401 and 402 illustrated in FIGS. 4A and 4B are described based on the preliminarily set log setting 600.

The output detail level 601 indicates the detail level of the operation log output by the GUI application 300 that is currently executed. Examples of the detail level include "none", "simple", and "detailed". When the detail level "none" is set, no operation log is output. When the detail level "simple" is set, a simple operation log as illustrated in FIG. 4A is output. When the detail level "detailed" is set, a detailed operation log as illustrated in FIG. 4B is output.

The manual operation detail level 602 indicates the detail level of the operation log output when it is determined that the GUI application 300 is not executed by the UI automatic operation application 320, i.e., the GUI application 300 is executed through a manual operation by the user. Examples of the detail level include "none", "simple", and "detailed", like the output detail level 601. However, since the present exemplary embodiment is described based on the premise that the content of processing performed by a user operation is analyzed, it is assumed that the detail level "detailed" is set in the present exemplary embodiment.

The automatic operation detail level 603 indicates the detail level of the operation log output when it is determined that the GUI application 300 is executed by the UI automatic operation application 320. Examples of the detail level include "none", "simple, and "detailed", like the output detail level 601. However, since the present exemplary embodiment is based on the premise that the degree of importance of processing already automated is lower than that of processing performed by a user operation, it is assumed that the detail levels "none" and "simple" are set in the present exemplary embodiment.

As the log output path 604, a file path to which the operation log 308 is output is stored.

[Log Output Detail Level Setting Flow]

Processing for setting the output detail level 601 in log setting will be described with reference to FIG. 7. According to the present exemplary embodiment, this processing flow is started in a case where starting of a process of the GUI application 300 is instructed when an application icon for the GUI application 300 is clicked by the user, or in a case where starting of a process of the GUI application 300 is instructed by the UI automatic operation application 320. Unless otherwise stated, processing in each step is executed by the log control unit 303.

In step S701, the log control unit 303 of the GUI application 300 acquires the log setting 600. An example of the log setting 600 is illustrated in FIG. 6 as described above.

In step S702, the log control unit 303 loads the manual operation detail level 602, the automatic operation detail level 603, and the log output path 604, which are included in the log setting 600. In step S703, the log control unit 303 acquires the UI automatic operation process list 500.

In step S704, a parent process for the GUI application 300 is acquired. Specifically, the parent process is acquired from attribute information present in the process of the GUI application 300. The term "parent process" used herein refers to the process in which the operation for starting the application 300 is carried out. When the process of the GUI application 300 is started, information about the parent process in which the process of the GUI application 300 is started is stored as attribute information in a memory. When the GUI application 300 is started by the UI automatic operation application 320, the parent process corresponds to the UI automatic operation application 320. The parent process for the UI automatic operation application 320 is determined depending on the starting method. The parent process may be, for example, an OS or another application.

Meanwhile, in a case where the GUI application 300 is started when the application icon is clicked by the user, the process provided by the OS corresponds to the parent process. For example, in the case of using Windows® as an OS developed by Microsoft® Corporation in the United States, Windows® Explorer is the parent process for the GUI application 300. Further, when the OS, such as Windows® Explorer, starts the process, the parent process is not present. In other words, the parent process is present in the GUI application started in a normal start operation (double-click of an icon) by a user operation.

In step S705, the log control unit 303 determines whether the parent process for the GUI application 300 has been acquired. In a case where it is determined that the parent process has been acquired (YES in step S705), the processing proceeds to step S706. In a case where it is determined that the parent process has not been acquired (NO in step S705), the processing proceeds to step S709.

In step S706, the log control unit 303 refers to the UI automatic operation process list 500 acquired in step S703 and acquires, from the UI automatic operation process list 500, a single UI automatic operation process 501 for which comparison processing in step S707 is not completed. In step S707, the log control unit 303 determines whether the parent process acquired in step S704 is identical to the UI automatic operation process 501 acquired in step S706. In a case where it is determined that the parent process is identical to the UI automatic operation process 501 (YES in step S707), the processing proceeds to step S711. In a case where it is determined that the parent process is not identical to the UI automatic operation process 501 (NO in step S707), the processing proceeds to step S708.

In step S708, the log control unit 303 determines whether comparison processing for comparing all UI automatic operation processes 501 included in the UI automatic operation process list 500 with the parent process acquired in step S704 is completed. In a case where it is determined that the comparison processing is completed (YES in step S708), the processing proceeds to step S709. In a case where it is determined that the comparison processing is not completed (NO in step S708), the processing returns to step S706.

After the comparison processing started in step S707 is completed, in step S709, the manual operation detail level 602 in the log setting 600 is acquired. In step S710, the manual operation detail level 602 acquired in step S709 is set as the output detail level 601, and then the processing is terminated.

After it is determined that the parent process corresponds to the UI automatic operation process in step S707, in step S711, the automatic operation detail level 603 in the log setting 600 is acquired, and in step S712, the automatic operation detail level 603 acquired in step S711 is set as the output detail level 601, and then the processing flow is terminated.

The processing described above enables the output detail level 601 of the log to be set as the automatic operation detail level 603 when the GUI application 300 is started by the UI automatic operation process 501 included in the UI automatic operation process list 500. In addition, the number of operation logs to be output can be reduced by preliminarily setting the automatic operation detail level 603 to the detail level "none" or the detail level "simple".

[Log Output Flow]

An operation log output flow when an operation is executed on the GUI application 300 according to the present exemplary embodiment will be described with reference to FIG. 8. This processing flow is started when the main window 1001 of the GUI application 300 is operated (e.g., when the control 1005 is pressed). According to the present exemplary embodiment, the main window 1001 is operated by a user operation or the UI automatic operation application 320. In this processing flow, the unit that executes the processing is the log control unit 303, unless otherwise stated.

In step S801, the log control unit 303 acquires the log setting 600. In step S802, the log control unit 303 acquires the output detail level 601 by referring to the log setting 600. In step S803, the log control unit 303 refers to the acquired output detail level 601 and determines which detail level is set. In a case where it is determined that the detail level "detailed" is set, the processing proceeds to step S804. In a case where it is determined that the detail level "simple" is set, the processing proceeds to step S806. In a case where it is determined that the detail level "none" is set, the processing is terminated without outputting any operation log.

In a case where the detail level "detailed" is set, in step S804, an output character string of a detailed log to be output as an operation log is generated. In a case where the detail level "simple" is set, in step S806, an output character string of a simple log to be output as an operation log is generated.

In step S805, the log output unit 304 that has received an output instruction from the log control unit 303 repeatedly outputs the log output character string for the operation log 308 generated in step S804 or S806 by referring to the log output path 604 in the log setting 600. Thus, the operation log character string corresponding to the operation content is added to the operation log 308 every time the GUI application 300 is operated.

Figure 7:
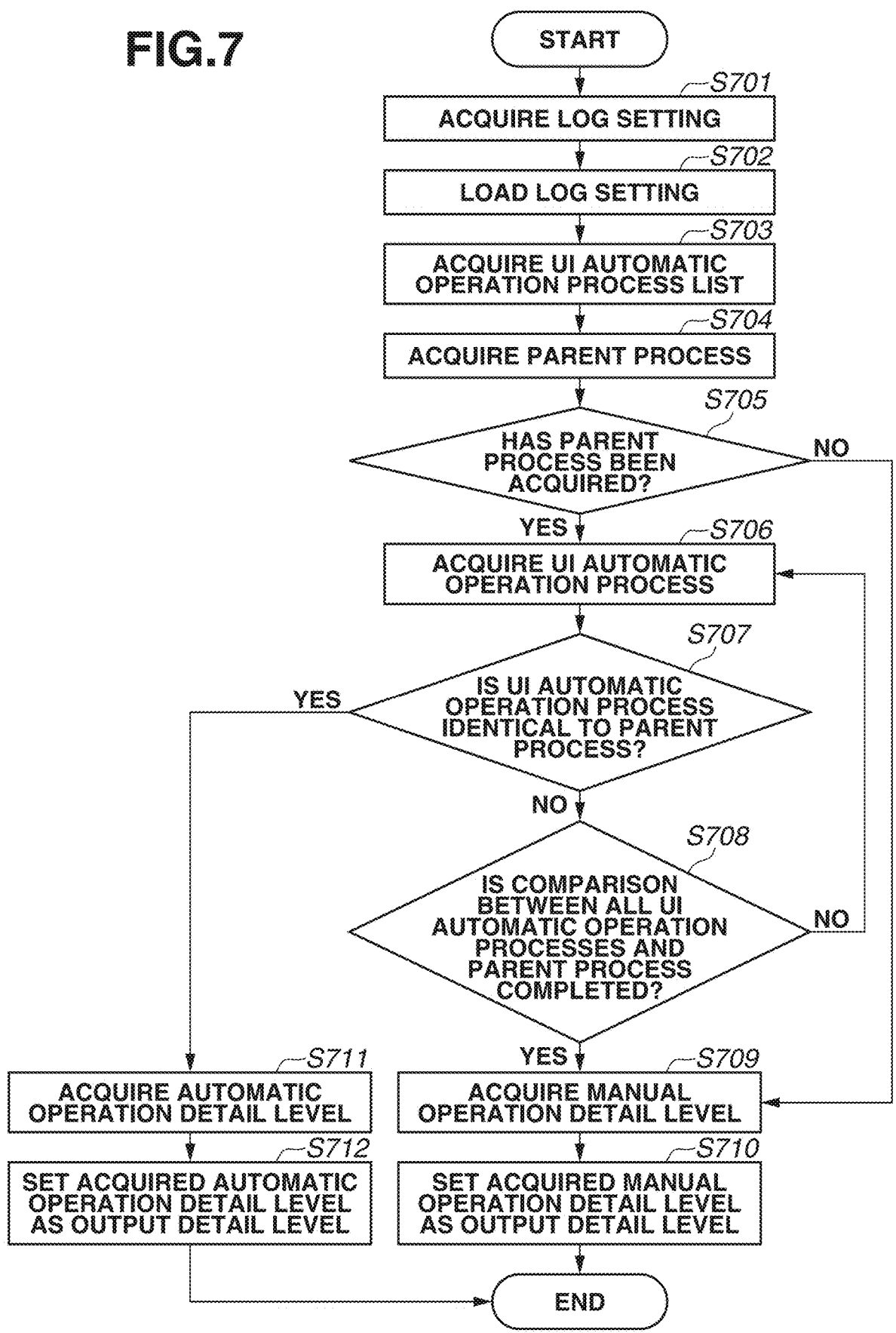
FIG. 7 is a flowchart illustrating log output detail level setting processing in a graphical user interface (GUI) application according to the first exemplary embodiment of the present disclosure.
Figure 8:
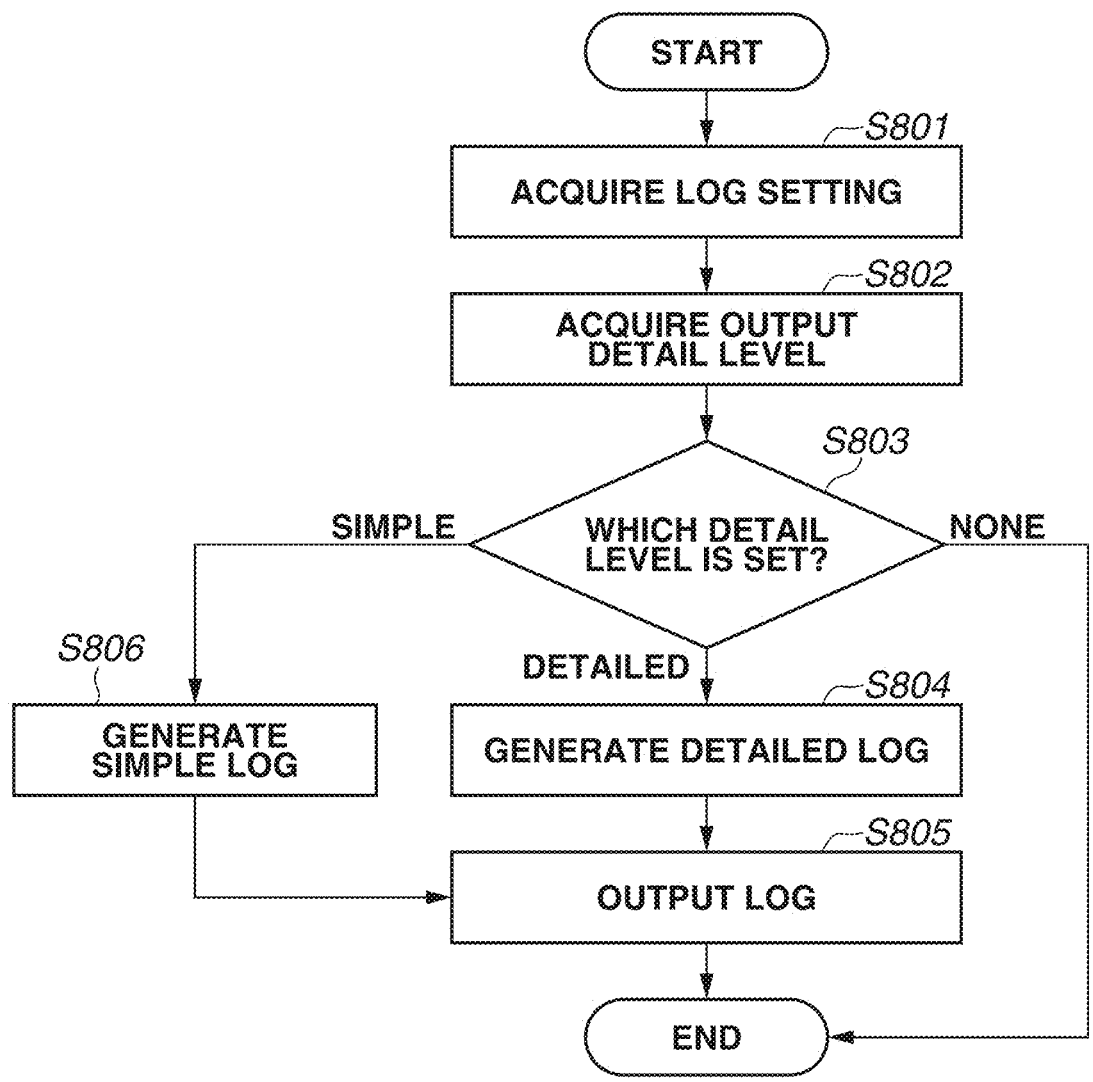
FIG. 8 is a flowchart illustrating log output processing in the GUI application according to the first exemplary embodiment of the present disclosure.

By the log output flow illustrated in FIG. 8, the operation log is output based on the detail level of the operation log set in the log output detail level setting flow illustrated in FIG. 7.

[Log Transmission Flow]

Figure 9:
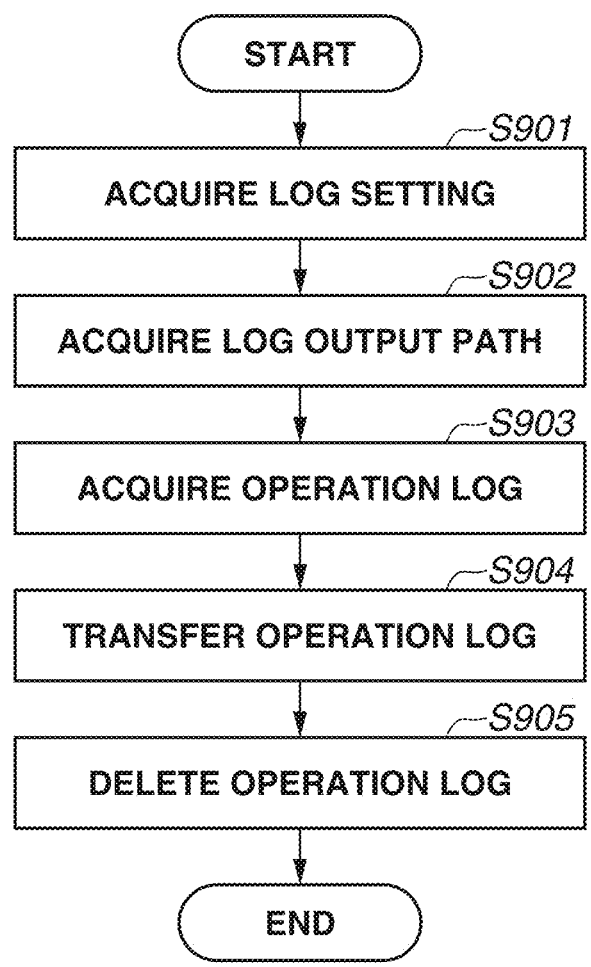
FIG. 9 is a flowchart illustrating log transmission processing in a log transmission application according to the first exemplary embodiment of the present disclosure.

A log transmission flow in which the log transmission application 310 transmits the operation log 308 to the cloud server 102 will be described with reference to FIG. 9. In this processing flow, the operation log is transmitted to the cloud server 102, for example, on a date and time that is scheduled in advance in the log transmission application 310. Alternatively, the log transmission application 310 may include a GUI to enable the user to transmit the operation log at any timing. More alternatively, operation logs may be transmitted when a certain number of operation logs are output to the client terminal 103.

In step S901, the log acquisition unit 311 acquires the log setting 600. In step S902, the log acquisition unit 311 acquires the log output path 604 by referring to the acquired log setting 600. In step S903, the log acquisition unit 311 acquires the operation log 308 by referring to the log output path 604. In step S904, the log acquisition unit 311 transfers the operation log 308 acquired in step S903 to the log transmission unit 312 and the log transmission unit 312 transmits the operation log 308 to the cloud server 102 via the Internet 101. After the operation log 308 is transmitted, in step S905, the log acquisition unit 311 deletes the operation log 308, and then the processing is terminated.

According to the present exemplary embodiment, the operation log acquired by automatic processing is not transmitted, or the operation log to be transmitted is simplified, to prevent transmission of the operation log of the operation that has already been automated. This leads to a reduction in the load on the network during transmission of operation logs.

The present exemplary embodiment illustrates a configuration in which the transmission of operation logs is performed by the log transmission application 310 which is different from the GUI application 300. Alternatively, a configuration in which the GUI application 300 includes a log acquisition unit and a log transmission unit and the GUI application 300 transmits operation logs may be employed.

According to the first exemplary embodiment, while the parent process is determined in a case where the number of GUI applications 300 for which the operation log is output is one (FIG. 3), the second exemplary embodiment illustrates a method for determining the parent process in a case where a plurality of GUI applications A and B works together.

Figure 12:
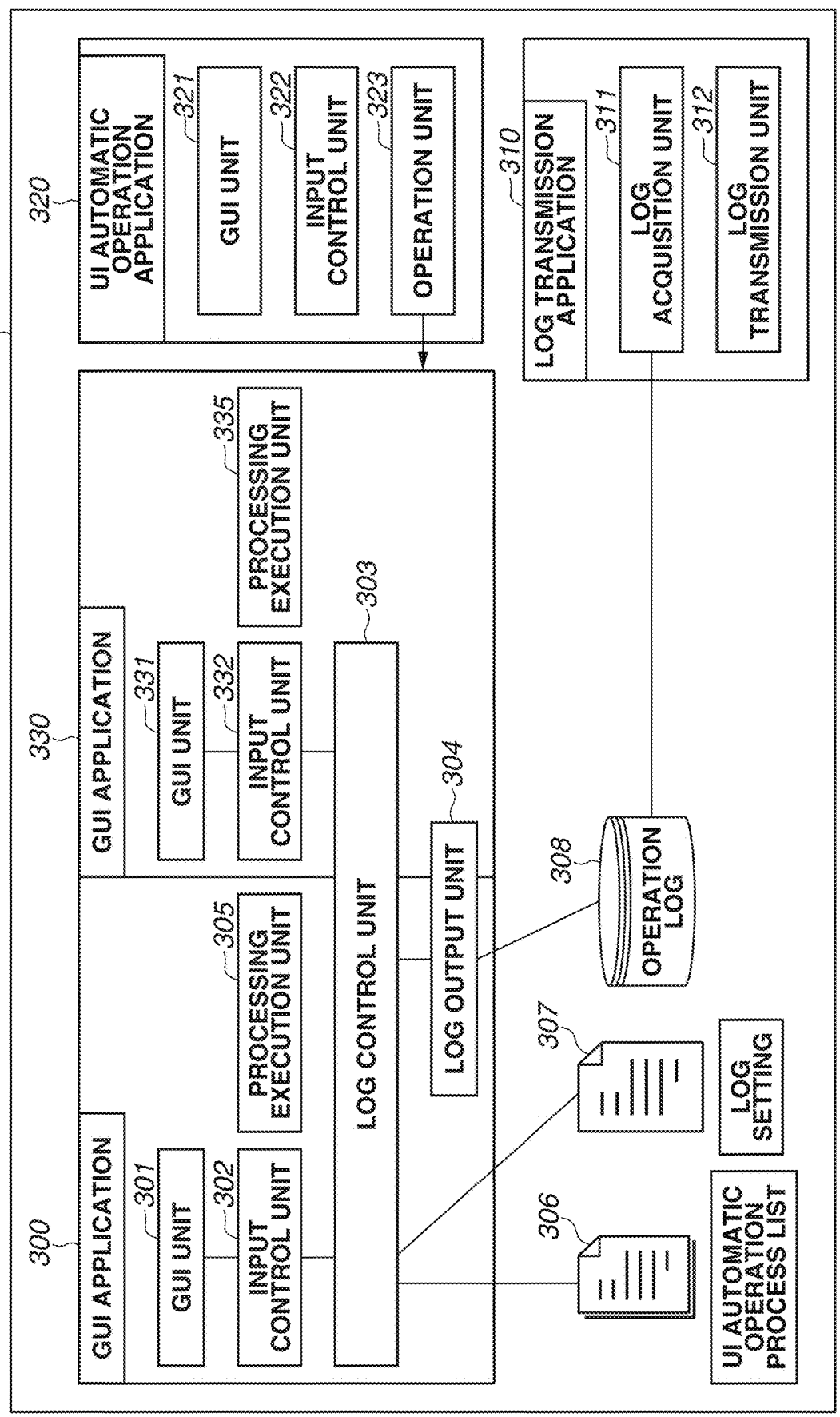
FIG. 12 is a block diagram illustrating a software configuration example of a client terminal according to a second exemplary embodiment of the present disclosure.

Specifically, as illustrated in FIG. 12, the GUI application 300 and a GUI application 330 work together. When a control for starting the GUI application 300 is present in the main window for the GUI application 330, the parent process for the GUI application 300 corresponds to the GUI application 330.

Meanwhile, it is considered that the UI automatic operation application 320 operates both the GUI application 300 and the GUI application 330. Specifically, it is considered that the GUI application 300 is started by operating the control for the GUI application 330 to start the GUI application 300 after the UI automatic operation application 320 has started the GUI application 330.

In this case, if the parent process for the GUI application 300 is determined by the processing indicated in step S707 according to the first exemplary embodiment, the parent process for the GUI application 300 does not correspond to the UI automatic operation application 320, and corresponds to the GUI application 330.

According to the first exemplary embodiment, it is also determined whether the parent process corresponds to the UI automatic operation application 320 based on the UI automatic operation process list 500 that is preliminarily determined. However, in the case of creating the UI automatic operation process list 500, it is necessary to recognize all UI automatic operation processes in advance. As a result, if the GUI application 300 is operated by the UI automatic operation application 320 that is not included in the UI automatic operation process list 500, it becomes impossible to determine that the UI automatic operation application 320 is the automatic operation.

Embodiments of the present invention will be described with reference to FIGS. 12 to 16. Components described above in the first exemplary embodiment are denoted by the same reference numerals, and the descriptions thereof are omitted. The present exemplary embodiment illustrates an example in which two GUI applications (300 and 330) are present. However, the number of GUI applications is not limited to two. Any number of GUI applications may be present, as long as a plurality of GUI applications is provided.

[Software Configuration]

FIG. 12 is a block diagram illustrating a software configuration of each of the GUI application 300 (330) and the client terminal 103 according to the present exemplary embodiment. All functions of the GUI applications 300 and 330 according to the present exemplary embodiment are implemented by programs that are executed by the client terminal 103 as described above with regard to the hardware configuration.

The GUI application 330 is displayed on the display 207 of the client terminal 103 and includes GUI units 301 and 331, an input control unit 332, the log control unit 303, the log output unit 304, and a processing execution unit 335. The GUI units 301 and 331 receive an input from an input device, such as a keyboard or a mouse. The input control unit 332 detects a user operation on the keyboard 208 through the GUI unit 331 and issues an instruction to perform processing based on the operation. The log control unit 303 controls the presence or absence of an output of an operation log and the content of the operation log, based on the content of processing to be executed according to the instruction from the input control unit 332. The log output unit 304 outputs the operation log in response to an output instruction from the log control unit 303. The processing execution unit 335 executes a function to be provided to the user according to the instruction from the input control unit 332.

According to the present exemplary embodiment, the log control unit 303 and the log output unit 304, which are included in the GUI application 330, the UI automatic operation process list 306, the log setting 307, and the operation log 308 are shared with the GUI application 300. However, the configuration according to the present exemplary embodiment is not limited to this configuration, but instead the GUI applications 300 and 330 may have different configurations.

<Example of Main Window 1501>

FIG. 15 illustrates a main window 1501 in the GUI application 330. The GUI application 330 includes a document management function for, for example, adding or deleting a document, or starting editing processing on a document.

The main window 1501 includes a menu/toolbar 1502, a folder display pane 1503, and a document display pane 1504. In the menu/toolbar 1502, various functions included in a document management system 210 are arranged. In the folder display pane 1503, folders 1506 managed by the GUI application 330 are displayed. In the document display pane 1504, a list of document data 1507 present in the folder selected in the folder display pane 1503 is displayed.

A control 1505 is an edit button for starting edition in the GUI application 300 including a document edition function for the document data 1507 selected in the document display pane 1504. When the control 1505 is pressed, the main window 1001 (FIG. 10) in the GUI application 300 is displayed. That is, the GUI application 300 can be started through the application 330.

[Data Structure]

Various setting data related to the present exemplary embodiment will be described.

Figure 13A:
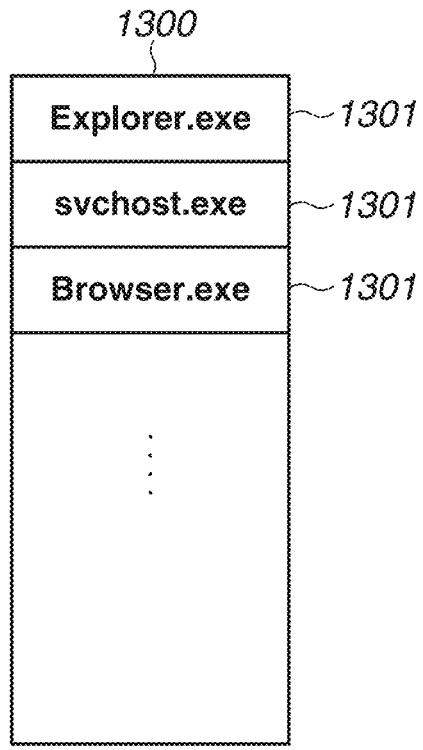
FIGS. 13A and 13B are diagrams illustrating data structures of an excluded process list and a candidate process list, respectively, according to the second exemplary embodiment of the present disclosure.

FIG. 13A illustrates that processes that are not recognized by the GUI applications 300 and 330 as processes of the UI automatic operation application 320 are managed as a list. This list is hereinafter referred to as an excluded process list 1300.

The excluded process list 1300 includes at least one excluded process 1301. Examples of the excluded process 1301 include processes of the GUI applications 300 and 330 and a process of an OS.

Figure 13B:
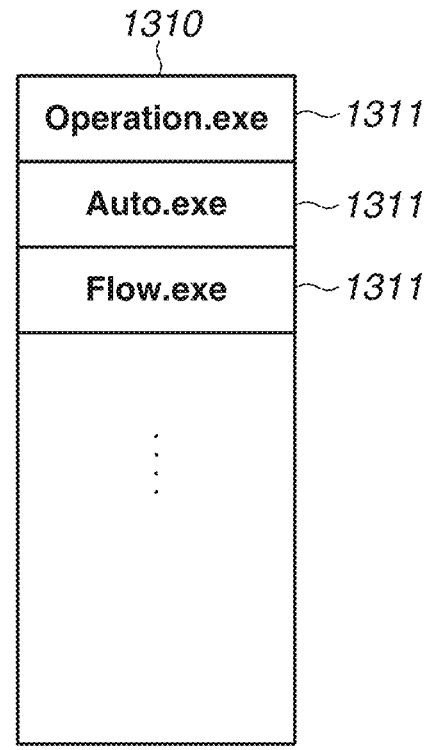

FIG. 13B illustrates that candidates for processes of the UI automatic operation application 320 are managed as a list. This list is hereinafter referred to as a candidate process list 1310. The candidate process list 1310 includes at least one candidate process 1311. Processes that are not included in either the UI automatic operation process list 500 or the excluded process list 1300 are stored in the candidate process list 1310.

[Log Output Detail Level Setting Flow]

A log output detail level setting flow at the time of starting processing for the GUI application 300 according to the present exemplary embodiment will be described with reference to FIG. 14. This processing flow is started not only by the starting method used in the processing flow illustrated in FIG. 7, but also by operating the control 1505 that is present in the GUI for the GUI application 330 and is used to for the UI automatic operation application 320 to start the GUI application 300. In this processing flow, the log control unit 303 executes the processing, unless otherwise stated. Components described above are denoted by the same reference numerals, and the descriptions thereof are omitted.

After acquiring the UI automatic operation process list, in step S1401, the log control unit 303 acquires the excluded process list 1300, and in step S1402, the log control unit 303 acquires the candidate process list 1310. After it is determined that the parent process is present by referring to the acquired process lists in step S705 (YES in step S705), the processing proceeds to step S1403. In step S1403, the log control unit 303 sets the parent process acquired in step S704, or the process acquired in step S1410, as a current process. The current process is a current process to be determination target when the parent process is determined.

In step S1404, whether the current process set in step S1403 is identical to the UI automatic operation process acquired in step S706 is determined. In a case where it is determined that the current process is identical to the UI automatic operation process (YES in step S1404), the processing proceeds to step S711 and the detail level during automatic operation is acquired. In a case where it is determined that the current process is not identical to the UI automatic operation process (NO in step S1404), the processing proceeds to step S1405.

After it is determined that the U 1 automatic operation process is not identical to the current process, in step S1405, whether the current process is included in the excluded process list 1300 is determined. In a case where it is determined that the current process is included in the excluded process list 1300 (YES in step S1405), the processing proceeds to step S708. In a case where it is determined that the current process is not included in the excluded process list 1300 (NO in step S1405), the processing proceeds to step S1406.

After it is determined that the current process is not included in the excluded process list 1300, in step S1406, whether the current process is included in the candidate process list 1310 is determined. In a case where it is determined that the current process is included in the excluded process list 1300 (YES in step S1406), the processing proceeds to step S708. In a case where it is determined that the current process is not included in the excluded process list 1300 (NO in step S1406), the processing proceeds to step S1407. By the processing of steps S1405 to 1407, the current process is added to any one of the process lists (500, 1300, or 1310).

After it is determined that the current process is not included in the candidate process, in step S1407, the current process is added to the candidate process list 1310. In this case, the candidate process list 1310 to be created or updated is referenced when the user adds the process to the UI automatic operation process list.

In step S708, in a case where it is determined that the comparison between all UI automatic processes and the current process is completed (YES in step S708), the processing proceeds to step S1408. In step S1408, the parent process for the current process is acquired. In step S1409, whether the parent process acquired in step S1408 has been acquired is determined. In a case where it is determined that the parent process has been acquired (YES in step S1409), the processing returns to step S1403 and steps S1404 to S1408 are repeatedly performed using the newly acquired parent process as the current process. In step S1409, in a case where it is determined that the parent process has not been acquired (NO in step S1409), it is determined that the current process itself corresponds to the parent process, and then the processing proceeds to step S709.

[Update of UI Automatic Operation Process List and Log Setting]

FIG. 16 is a diagram illustrating an example of a UI for adding a process to the UI automatic operation process list 500, or deleting a process from the UI automatic operation process list 500. A management dialogue 1600 for the UI automatic operation process is a dialogue for performing a setting about the GUI application 300 and is displayed when the control 1006 is pressed. The dialogue illustrated in FIG. 16 is created based on the candidate process list 1310 and the UI automatic operation process list 500.

A process being executed/candidate process list view 1601 is an area in which a process currently running on the OS and processes present in the candidate process list 1310 are displayed. A candidate process item 1602 corresponds to the candidate process 1311 included in the candidate process list 1310, and is displayed in such a manner that the candidate process item 1602 is distinguished from process items 1603 that are being executed as running processes at the time when the dialog is displayed. The candidate process item 1602 is distinguished from the other process items by, for example, using different colors or different line widths of text. According to the present exemplary embodiment, the latter configuration is employed and each candidate process is displayed in bold.

In a UI automatic operation process list view 1604, the UI automatic operation process 501 that is present in the UI automatic operation process list 500 is displayed as a UI automatic operation process item 1605.

An add button 1606 is used to add, to the UI automatic operation process list view 1604, the candidate process item 1602 or the running process items 1603 selected in the process list view 1601. A delete button 1607 is used to delete, from the UT automatic operation process list view 1604, the UI automatic operation process item 1605 selected in the UI automatic operation process list view 1604.

A log setting 1608 indicates a control for displaying a dialogue for making a detailed setting about an operation log. FIG. 17 is a diagram illustrating an example of a log setting dialogue 1701 to be displayed when the log setting 1608 is pressed.

The log setting 1608 is provided in the management dialogue 1600 as an operation unit for setting the detail level of an operation log. However, the operation method for setting the detail level is not limited to this method, but instead a method of setting the detail level through a toolbar or the like on the main window 1101 may be used.

Figure 14:
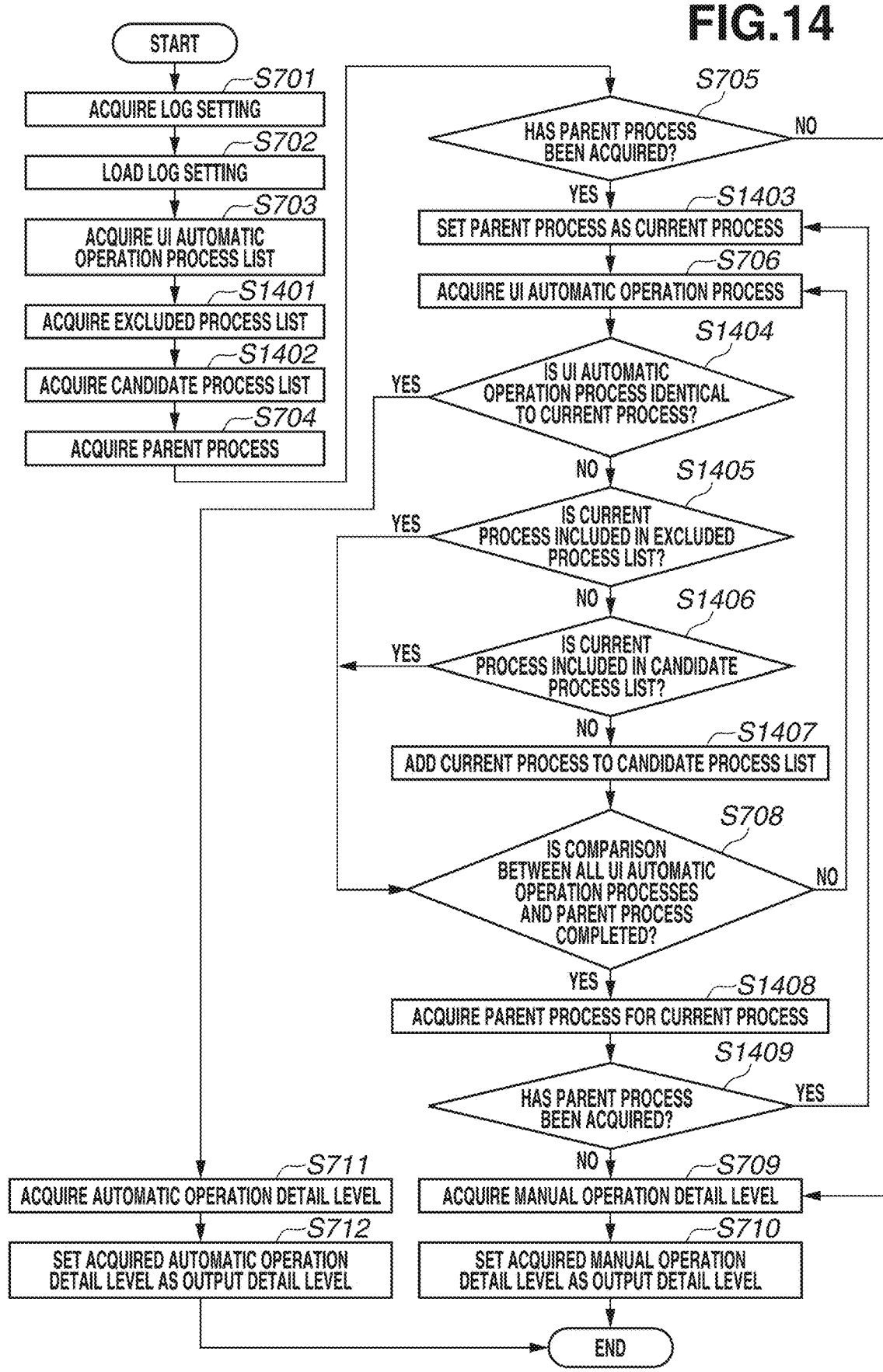
FIG. 14 is a flowchart illustrating log output detail level setting processing in a GUI application according to the second exemplary embodiment of the present disclosure.

In this manner, the UI automatic operation process to be referenced in step S1404 illustrated in FIG. 14 is created based on the management dialogue 1600 illustrated in FIG. 16.

<Log Setting Dialogue>

A log setting dialogue 1700 will be described with reference to FIG. 17. In the log setting dialogue 1701, the manual operation detail level 602 and the automatic operation detail level 603 in the log setting 600 can be changed.

The log setting dialogue 1701 to be displayed during manual operation indicates a control for setting the manual operation detail level 602 and is displayed in a format in which any one of the detail levels "none", "simple", and "detailed" is selected. A log setting dialogue 1702 to be displayed during automatic operation indicates a control for setting the automatic operation detail level 603. The log setting dialogue 1702 employs a format similar to that for the log setting dialogue 1701 to be displayed during manual operation. In this case, "detailed" is set as the detail level in the log setting during manual operation, and "none" is set as the detail level in the log setting during automatic operation. The log setting dialogue 1700 has been described above.

In an example illustrated in FIG. 17, three detail levels, i.e., "none", "simple", and "detailed", can be set for each operation log. Alternatively, the setting items may be limited in such a manner that the detail level "none" cannot be selected in the log setting dialogue 1701 to be displayed during manual operation, and the detail level "detailed" cannot be selected in the log setting dialogue 1702 to be displayed during automatic operation.

As described above, since the present exemplary embodiment is directed to causing the cloud server 102 to analyze an operation log of a user operation, there is no need to provide the detail levels "simple" and "detailed" for the log setting dialogue 1702. However, FIG. 17 illustrates the configuration, such as the log setting dialogue 1702, based on a case where an operation log obtained during automatic operation is required in the case of causing the cloud server 102 to analyze the operation log.

Referring again to FIG. 16, when an OK button 1609 is pressed, contents changed in the management dialogue 1600 for the UI automatic operation process are reflected in each of the UI automatic operation process list 500 and the candidate process list 1310, and then the log setting dialogue 1700 is closed.

For example, when the candidate process item 1602 is added to the UI automatic operation process list view 1604, the candidate process item 1602 is deleted from the candidate process list 1310. Further, when the UI automatic operation process item 1605 is deleted from the UI automatic operation process list view 1604, the UI automatic operation process item 1605 is deleted from the UI automatic operation process list 500.

When a cancel button 1610 is pressed, the management dialogue 1600 is closed without reflecting the contents changed in the management dialogue 1600 for the UI automatic operation process in each of the UI automatic operation process list 500 and the candidate process list 1310.

When an OK button 1703 is pressed, the dialog is closed after reflecting the contents changed in the log setting dialogue 1700 in the log setting 600. The cancel button 1610 is pressed to thereby close the log setting dialogue 1700 without reflecting the contents changed in the log setting dialogue 1700 in the log setting 600. The processing described above enables the user to add a desired process to the UI automatic operation list or delete a desired process from the UI automatic operation list.

According to the present exemplary embodiment, it is possible to specify the parent process even when a plurality of applications is present and one of the applications is started by a certain application.

Other Embodiments

In the first exemplary embodiment, operation logs for UI automatic processes are prevented from being output by setting the output detail level in step S712 illustrated in FIG. 7. In addition to this configuration, it is also possible to employ a configuration in which, while operation logs for UI automatic processes are output, whether to transmit the operation logs by determining whether each operation log is an operation log for a UI automatic process is determined in the step of transmitting the operation log to the cloud server 102 (FIG. 9).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-143942, filed Jul. 31, 2018, which is hereby incorporated by reference herein in its entirety.

What is claimed is:

1. An information processing apparatus that includes comprising:
   a processor; and
   a memory that stores a log transmission program, an automatic operation application, information for specifying the automatic operation application, and one or more graphical user interface (GUI) applications for providing a specific function through a screen of the information processing apparatus and transmits,
   wherein the processor executes the automatic operation application to perform automatic operations corresponding to user operations on the one or more GUI applications,
   wherein the processor determines, based on the stored information, whether the one or more GUI applications are started by the automatic operation application,
   wherein the processor executes the log transmission program to transmit, to a server, operation logs obtained when the one or more GUI applications are executed, and
   wherein in a case where it is determined, based on the stored information, that the one or more GUI applications are started by the automatic operation application, the operation logs are not transmitted to the server when the one or more GUI applications are executed with the automatic operation.

2. The information processing apparatus according to claim 1, wherein in a case where it is determined that the one or more GUI applications are started by a user, the operation logs obtained when the one or more GUI applications are executed with user operations are transmitted to the server.

3. The information processing apparatus according to claim 1,
   wherein the processor sets a detail level of the operation logs obtained while the one or more GUI applications are executed with the automatic operation, and
   wherein the operation logs to be transmitted are determined based on the set detail level.

4. The information processing apparatus according to claim 3, wherein the set detail level is selected from a first level in which the operation logs of the one or more GUI applications started by the automatic operation application are not output, a second level in which simple operation logs of the one or more GUI applications are output, and a third level in which detailed operation logs of the one or more GUI applications are output.

5. The information processing apparatus according to claim 1, wherein, in a case where the processor determines, based on the stored information, that a parent process for the started one or more GUI applications are the automatic operation application, the processor determines that the started one or more GUI applications are started by the automatic operation application.

6. The information processing apparatus according to claim 5,
   wherein in a case where the processor determines that the parent process does not correspond to the automatic operation application, it is determined whether the parent process is included in one of an excluded process list and a candidate process list, the excluded process list being a list of processes that are not included in the automatic operation application, the candidate process list being a list of candidates for processes included in the automatic operation application, and
   wherein in a case where the processor determines that the parent process corresponds to the automatic operation application, determination of whether the parent process is included in one of the excluded process list and the candidate process list is not performed.

7. An information processing apparatus, comprising:
   a processor; and
   a memory that stores a log transmission program, an automatic operation application, information for specifying the automatic operation application and one or more graphical user interface (GUI) applications for providing a specific function through a screen of the information processing apparatus,
   wherein a user is able to add a specific application as the automatic operation application to the stored information and to delete the specific application from the stored information,
   wherein the processor executes the automatic operation application to perform automatic operations corresponding to user operations on the one or more GUI applications, wherein the processor determines, based on the stored information, whether the one or more GUI applications are started by the automatic operation application, wherein the processor executes the log transmission program to transmit, to a server, operation logs obtained when the one or more GUI applications are executed, and wherein, in a case where it is determined, based on the stored information, that the one or more GUI applications are started by the automatic operation application, an amount of the operation logs to be transmitted to the server is less than an amount of operation logs output from the one or more GUI applications which are not started by the automatic operation application.

8. The information processing apparatus according to claim 7, wherein the server is a learning apparatus and creates a process that is included in the automatic operation application, based on the operation log acquired from the information processing apparatus.

9. A non-transitory computer-readable storage medium storing a program including executable instructions, which when executed by one or more processors of an information processing apparatus that stores a log transmission program, an automatic operation application, information for specifying the automatic operation application, and one or more GUI applications for providing a specific function through a screen of the information processing apparatus, wherein a user is able to add a specific application as the automatic operation application to the stored information and to delete the specific application from the stored information, cause the information processing apparatus to:

execute the automatic operation application to perform automatic operations corresponding to user operations on the one or more GUI applications;

determine, based on the stored information, whether the one or more GUI applications are started by the automatic operation application; and execute the log transmission program to transmit, to a server, operation logs obtained when the one or more GUI applications are executed, wherein in a case where it is determined, based on the stored information, that the one or more GUI applications are started by the automatic operation application, the operation logs are not transmitted to the server when the one or more GUI applications are executed with the automatic operation.

10. A control method for an information processing apparatus that stores a log transmission program, an automatic operation application, information for specifying the automatic operation application, and one or more GUI applications for providing a specific function through a screen of the information processing apparatus, wherein a user is able to add a specific application as the automatic operation application to the stored information and to delete the specific application from the stored information, the control method comprising:

executing the automatic operation application to perform automatic operations corresponding to user operations on the one or more GUI applications;

determining, based on the stored information, whether the one or more GUI applications are started by the automatic operation application; and executing the log transmission program to transmit, to a server, operation logs obtained when the one or more GUI applications are executed, wherein in a case where it is determined, based on the stored information, that the one or more GUI applications are started by the automatic operation application, the operation logs are not transmitted to the server when the one or more GUI applications are executed with the automatic operation.

11. An information processing system comprising:
an information processing apparatus; and
a server,
wherein the information processing apparatus comprises:
a processor; and
a memory that stores a log transmission program, an automatic operation application, information for specifying the automatic operation application, and one or more GUI applications for providing a specific function through a screen of the information processing apparatus, wherein a user is able to add a specific application as the automatic operation application to the stored information and to delete the specific application from the stored information, wherein the processor executes the automatic operation application to perform automatic operations corresponding to user operations on the one or more GUI applications, wherein the processor determines, based on the stored information, whether the one or more GUI applications are started by the automatic operation application, wherein the processor executes the log transmission program to transmit, to the server, operation logs obtained when the one or more GUI applications are executed, and wherein in a case where it is determined, based on the stored information, that the one or more GUI applications are started by the automatic operation application, the operation logs are not transmitted to the server when the one or more GUI applications are executed with the automatic operation.

12. A non-transitory computer-readable storage medium storing a program including executable instructions, which when executed by one or more processors of an information processing apparatus that stores a log transmission program, an automatic operation application, information for specifying the automatic operation application and one or more graphical user interface (GUI) applications for providing a specific function through a screen of the information processing apparatus, wherein a user is able to add a specific application as the automatic operation application to the stored information and to delete the specific application from the stored information, cause the information processing apparatus to:

execute the automatic operation application to perform automatic operations corresponding to user operations on the one or more GUI applications;

determine, based on the stored information, whether the one or more GUI applications are started by the automatic operation application; and execute the log transmission program to transmit, to a server, operation logs obtained when the one or more GUI applications are executed, wherein, in a case where it is determined, based on the stored information, that the one or more GUI applications are started by the automatic operation application, an amount of the operation logs to be transmitted to the server is less than an amount of operation logs output from the one or more GUI applications which are not started by the automatic operation application.

13. A control method for an information processing apparatus that stores a log transmission program, an automatic operation application, information for specifying the automatic operation application and one or more graphical user interface (GUI) applications for providing a specific function through a screen of the information processing apparatus, wherein a user is able to add a specific application as the automatic operation application to the stored information and to delete the specific application from the stored information, the control method comprising:

executing the automatic operation application to perform automatic operations corresponding to user operations on the one or more GUI applications;

determining, based on the stored information, whether the one or more GUI applications are started by the automatic operation application; and executing the log transmission program to transmit, to a server, operation logs obtained when the one or more GUI applications are executed, wherein, in a case where it is determined, based on the stored information, that the one or more GUI applications are started by the automatic operation application, an amount of the operation logs to be transmitted to the server is less than an amount of operation logs output from the one or more GUI applications which are not started by the automatic operation application.

\* \* \* \* \*